US012476416B2

(12) United States Patent
Cho et al.

(10) Patent No.: US 12,476,416 B2
(45) Date of Patent: Nov. 18, 2025

(54) HEATING CABLE CONNECTING DEVICE AND FLEXIBLE HEATER WITH THE SAME

(71) Applicant: UNION CO., LTD., Cheonan-si (KR)

(72) Inventors: Kyung Sang Cho, Pyeongtaek-si (KR); Ha Kyung Chang, Gyeongju-si (KR)

(73) Assignee: UNION CO., LTD., Cheonan-si (KR)

( * ) Notice: Subject to any disclaimer, the term of this patent is extended or adjusted under 35 U.S.C. 154(b) by 898 days.

(21) Appl. No.: 17/713,430

(22) Filed: Apr. 5, 2022

(65) Prior Publication Data

US 2022/0329003 A1 Oct. 13, 2022

(30) Foreign Application Priority Data

Apr. 9, 2021 (KR) ........................ 10-2021-0046774

(51) Int. Cl.
*H01R 13/533* (2006.01)
*H05B 3/56* (2006.01)

(52) U.S. Cl.
CPC ............ *H01R 13/533* (2013.01); *H05B 3/56* (2013.01)

(58) Field of Classification Search
CPC ..... H01R 13/533; H05B 3/56; H05B 2214/04
See application file for complete search history.

(56) References Cited

U.S. PATENT DOCUMENTS 3,195,320 A * 7/1965 Shoichi .................. F25D 21/08 62/515

FOREIGN PATENT DOCUMENTS

| | | | | |
|---|---|---|---|---|
| DE | 19541021 A1 * | 5/1996 | ............... | H05B 3/56 |
| KR | 10-2032408 B1 | 10/2019 | | |
| KR | 20190126030 A * | 11/2019 | ............ | F16L 51/025 |
| KR | 10-2072824 B1 | 2/2020 | | |

* cited by examiner

*Primary Examiner* — Edward F Landrum
*Assistant Examiner* — Kuangyue Chen
(74) *Attorney, Agent, or Firm* — NKL LAW; Jae Youn Kim

(57) ABSTRACT

Disclosed are a heating cable connecting device and a flexible heater employing the same, in which the heating cable connecting device insulates a heating cable applied to a flexible heater to connect the heating cable to a terminal unit and includes an explosion-proofing device configured to be connected to one end of a connecting cable by explosion proofing one end of the heating cable, and an insulating device configured to insulate an opposite end of the connecting cable to connect the opposite end of the connecting cable to an opposite end of a lead wire having one end connected to the terminal unit. The explosion-proofing device and the insulating device are provided on inside and outside surfaces of the flexible heater, respectively, so that a power supply line can be thermally and electrically insulated.

4 Claims, 3 Drawing Sheets

HEATING CABLE CONNECTING DEVICE AND FLEXIBLE HEATER WITH THE SAME

BACKGROUND OF THE INVENTION

1. Field of the Invention

The present invention relates to a flexible heater, and more specifically, to a heating cable connecting device for connecting a power supply line between a terminal unit and a heating cable applied to a flexible heater constituting an exhaust heating system.

2. Description of Related Art

In general, a semiconductor manufacturing process refers to a series of processes in which various processes, such as an oxidation process, a diffusion process, a photo process, an etching process, an ion implantation process, a deposition process, and a metal wiring process, are repeatedly performed on a silicon wafer. Most of semiconductor manufacturing facilities that perform each of the above processes maintain a high vacuum state in order to prevent deterioration of characteristics of semiconductor devices or a decrease in yield rate due to foreign substances such as dust particles during the processes.

In most semiconductor manufacturing facilities requiring the vacuum environment, a vacuum device is installed to create the vacuum environment, and the vacuum device is largely composed of a vacuum pump, a vacuum line, and an exhaust line.

The vacuum line of the vacuum device connects the semiconductor manufacturing facility requiring the vacuum environment to the vacuum pump, and a bellows having elasticity and flexibility is used instead of a pipe in locations where the pipe configuration of the semiconductor manufacturing facility is complicated or the flexibility is required because the vacuum line of the vacuum device cannot be connected only horizontally or vertically depending on the installation position of the semiconductor manufacturing facility and the vacuum device.

A typical bellows has flanges coupled to both side ends of the bellows, so the bellows can be installed in an exhaust line, a vacuum pump, a semiconductor process chamber, or the like through the flanges.

That is, a large amount of solids and fusible by-products are generated in chambers, fore lines, exhaust lines, or the like during the etching, chemical vapor deposition (CVD), metal, and diffusion processes for a semiconductor and a display, and such materials accumulated inside the vacuum pipe may cause deterioration of equipment performance, reduction in production yield, and contamination of a particle source and a chamber interior due to the back stream of the deposited materials.

The etching process following the CVD process is the most basic process in manufacturing of a flat panel display or a semiconductor to form very precisely a thin film of several layers representing characteristics of a semiconductor, and a switch pattern of a semiconductor can be formed through etching.

In order to induce the above reaction, only a small amount of various process gases supplied to the chamber is used, and most are discharged through the exhaust pipe.

Meanwhile, in the process of discharging various process gases through the exhaust pipe, the various process gases may react with each other to form powder.

When the powders start to be precipitated in the pipe, back pressure in the exhaust pipe may rise, thereby interrupting (clogging) the smooth exhaust activity, and applying an unnecessary load to the vacuum pump so that the PM (Preventive Maintenance) cycle is shortened. In the worst case, there is a problem in that the pump stops or malfunctions during the process so that a silicon wafer or glass used as a substrate material may be contaminated, resulting in huge losses.

In order to solve the above problem, various methods have been tried, such as a method of injecting high-temperature nitrogen gas (hot N2) into the exhaust pipe, a method of applying an inner heater, a method of applying a flexible heater, or the like. However, even if these methods are applied, only the effect of delaying the precipitation of the powder is possible, and there is a limitation to completely prevent the precipitation of the powder.

In the method of applying the flexible heater, the entire section between a vacuum pump and a scrubber is connected with a flexible heater having a triple structure in which a mineral insulated (MI) heater is inserted.

In this way, when the MI cable type heating cable is installed on the flexible heater, the heating cable and the terminal unit are connected using a power supply line.

However, when the power supply line is applied to the flexible heater according to the related art, the power supply line may be disconnected due to high temperature heat and moisture generated from the flexible pipe and external shock and vibration, or an explosion accident may occur due to a short circuit.

In order to solve the above problem, according to the related art, an insulation section of 1 m or more is provided in the flexible heater for insulation and cooling of the power supply line, so that the length of the flexible heater becomes unnecessarily long, and there is a problem in that the manufacturing cost is increased.

In addition, the flexible heater according to the related art has a problem in that airtightness is broken at a portion that is drawn out to connect the power supply line to the terminal unit, so that the leakage of the fluid flowing in the flexible heater is generated.

DOCUMENTS OF RELATED ART

Patent Documents (Patent Document 1) Korean Patent Registration No. 10-2032408 (issued on Oct. 15, 2019)

(Patent Document 2) Korean Patent Registration No. 10-2072824 (issued on Feb. 4, 2020)

SUMMARY OF THE INVENTION

The present invention has been made to solve the above problems and an object of the present invention is to provide a heating cable connecting device for connecting a heating cable to a terminal unit by thermally and electrically insulating a power supply line that supplies power to the heating cable applied to a flexible heater.

Another object of the present invention is to provide a heating cable connecting device and a flexible heater employing the same, capable of preventing leakage due to the connection of a heating cable and a power supply line, and preventing explosion accident due to disconnection and short-circuit of the power supply line.

In order to achieve the above objects, a heating cable connecting device according to the present invention insulates a heating cable applied to a flexible heater to connect the heating cable to a terminal unit, and includes an explosion-proof device configured to be connected to one end of the connecting cable by explosion-proofing one end of the heating cable, and an insulating device configured to insulate an opposite end of the connecting cable to connect the opposite end of the connecting cable to an opposite end of a lead wire having one end connected to the terminal unit.

In addition, in order to achieve the above object, a flexible heater employing a heating cable connecting device according to the present invention connects a heating cable to a power supply line by thermally and electrically insulating the heating cable and the power supply line using the heating cable connecting device, thereby supplying power to the heating cable and preventing explosion caused by disconnection or short circuit.

As described above, according to the heating cable connecting device and the flexible heater employing the same of the present invention, an explosion-proofing device and an insulating device are provided on inside and outside surfaces of the flexible heater, respectively, so that a power supply line can be thermally and electrically insulated.

That is, according to the present invention, the explosion-proofing device is provided inside the flexible heater and the insulating device is provided between the flexible heater and the terminal unit, so that the effect of preventing the power supply line from being subject to thermal breakage and damage can be obtained.

Therefore, according to the present invention, the disconnection of the power supply line due to thermal damage occurring in the flexible heater can be prevented, so that it is possible to prevent the driving of the heating cable from being stopped due to the cut-off of power supplied to the heating cable.

In addition, according to the present invention, the power supply line can be effectively insulated and cooled thermally and electrically, so the length of the cooling section can be reduced compared to the length of the cooling section applied to the conventional flexible heater.

As a result, according to the present invention, the power supply line can be prevented from being broken or damaged, so that time, human, and economic costs for maintenance work such as replacing the power supply line can be minimized.

DETAILED DESCRIPTION OF THE INVENTION

Hereinafter, a heating cable connecting device and a flexible heater employing the same according to a preferred embodiment of the present invention will be described in detail with reference to the accompanying drawings.

In the following description, terms indicating directions such as 'left', 'right', 'front', 'rear', 'upward' and 'downward' may be defined based on the state shown in each drawing.

Although the present embodiment is described in association with the configuration of a flexible heater applied to a vacuum device of a semiconductor manufacturing facility, the present invention is not necessarily limited thereto, but can be modified to be applied to an exhaust line for discharging reaction gases generated in various product production processes such as semiconductors and LCDs.

First, the configuration of a flexible heater employing a heating cable connecting device according to a preferred embodiment of the present invention will be briefly described with reference to FIGS. 1 and 2.

Figure 1:
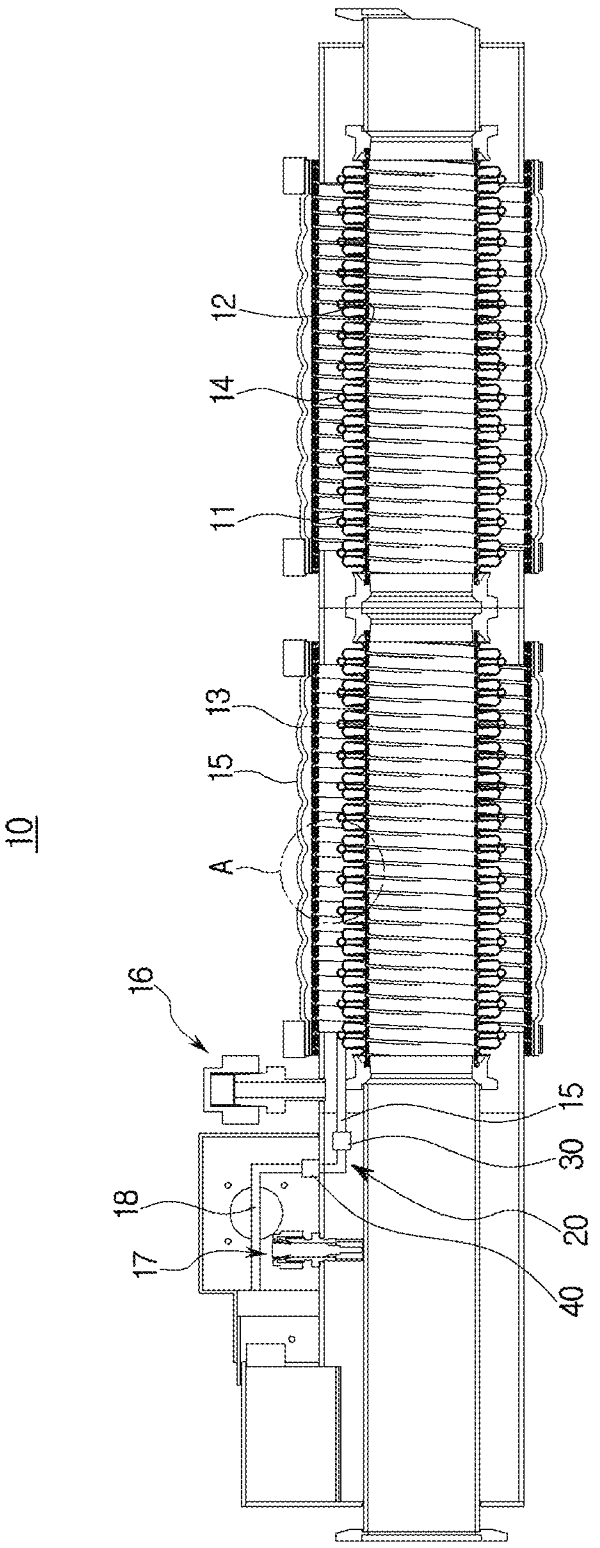
FIG. 1 is a view showing a configuration of a flexible heater employing a heating cable connecting device according to a preferred embodiment of the present invention.
Figure 2:
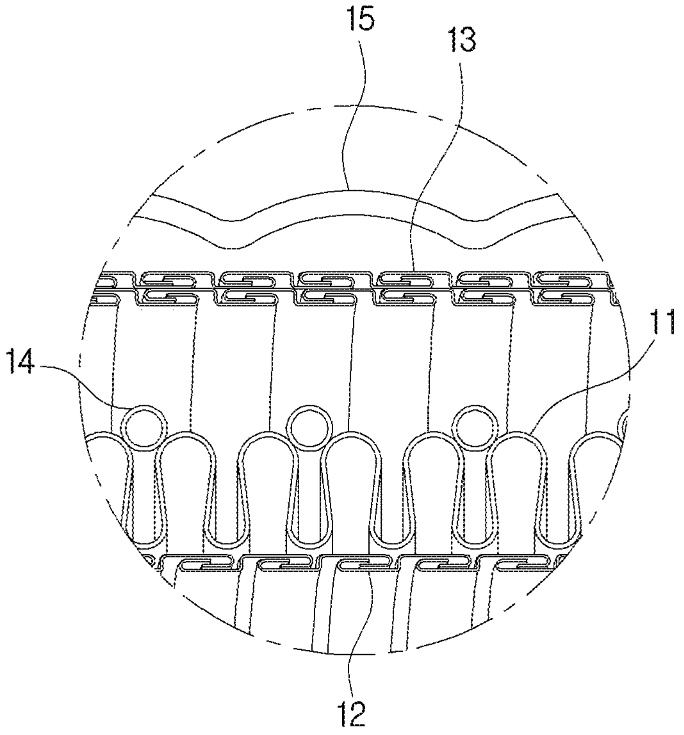
FIG. 2 is an enlarged view of part A shown in FIG. 1.

FIG. 1 is a view showing the configuration of the flexible heater employing the heating cable connecting device according to a preferred embodiment of the present invention, and FIG. 2 is an enlarged view of part A shown in FIG. 1.

As shown in FIGS. 1 and 2, the flexible heater 10 employing the heating cable connecting device according to a preferred embodiment of the present invention may be configured by overlapping a plurality of pipes to connect between a vacuum pump and a scrubber, and the length and shape of the flexible heater 10 may be configured to be variable as a whole or in part depending on the section where the flexible heater 10 is applied.

That is, the flexible heater 10 may be prepared as a quadruple structure including a bellows pipe 11, an internal interlock pipe 12 provided inside the bellows pipe 11 and functioning as a liner, an external interlock pipe 13 provided outside the bellows pipe, and a heating cable 14 installed on the outer surface of the bellows pipe 11 to heat gas flowing inside the interlock pipe 12.

A coating layer 15 may be further provided on the outside of the external interlock pipe 13 to prevent leakage of fluid while providing a warming effect.

In addition, the flexible heater 10 may be configured to be entirely flexible as described above, or may include a plurality of fixed sections having a double pipe structure with a constant length and a straight shape and one or more flexible sections provided between the plurality of fixed sections and configured to be variable in length and shape.

On one side of the flexible heater 10, there may be provided a leakage detection unit 16 configured to detect leakage of exhaust gas through the bellows pipe 11, a temperature sensing unit 17 configured to sense the internal temperature of the flexible heater 10, and a terminal unit 18 to which a power supply line connected to the heating cable 14 is connected.

The terminal unit 18 may receive external commercial power and supply power converted into voltage values and current values, which may be supplied to the heating cable 14, to the power supply line.

However, the present invention is not necessarily limited thereto. The number or arrangement structure of the bellows pipe and the interlock pipe constituting the flexible heater may be variously changed, and each sensing unit may be removed or new sensing units may be added.

Next, the configuration of the heating cable connecting device according to a preferred embodiment of the present invention will be described in detail with reference to FIGS. 1 and 3.

Figure 3:
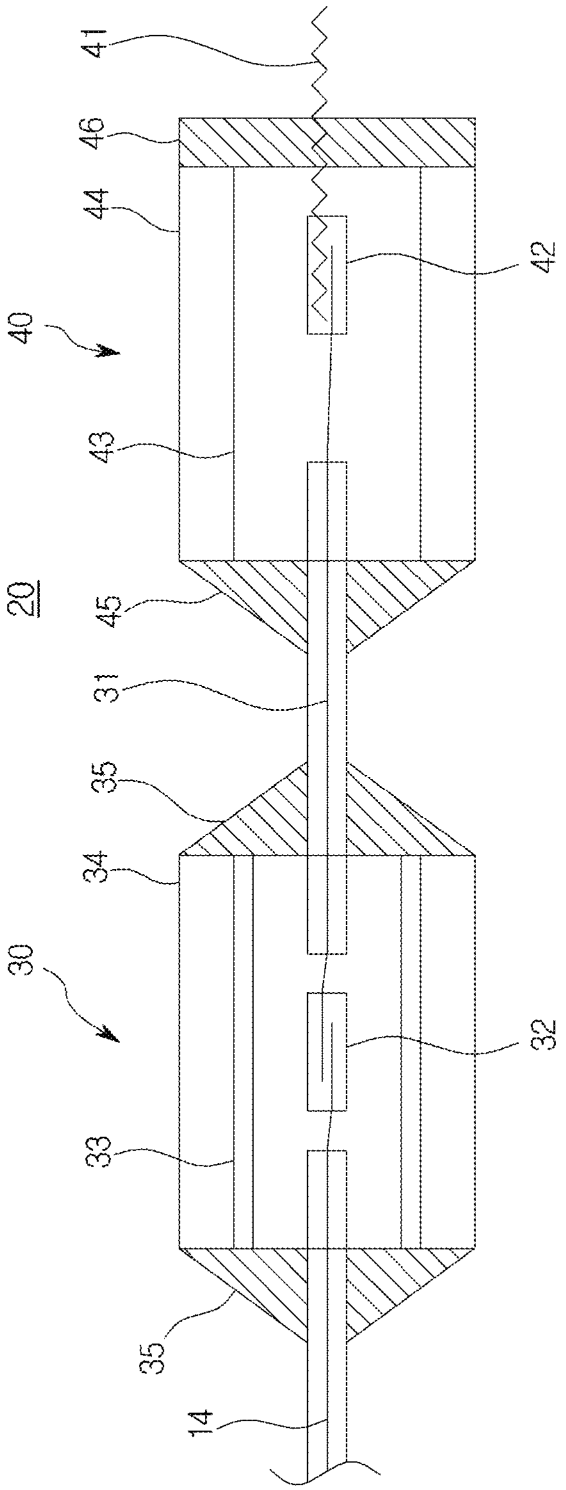
FIG. 3 is a view showing a configuration of a heating cable connecting device according to a preferred embodiment of the present invention.

FIG. 3 is a view showing the configuration of the heating cable connecting device according to a preferred embodiment of the present invention.

As shown in FIG. 3, the heating cable connecting device 20 according to a preferred embodiment of the present invention may insulate the heating cable 14 applied to the flexible heater 10 to connect the heating cable 14 to the terminal unit 18, and may include an explosion-proofing device 30 configured to be connected to one end of the connecting cable 31 by explosion-proofing one end of the heating cable 14, and an insulating device 40 configured to insulate the other end of the connecting cable 31 to connect the other end of a lead wire 41 having one end connected to the terminal unit 18 to the other end of the connecting cable 31.

The connecting cable 31 may be prepared as a non-resistance cable having no resistance, which is manufactured by using MI nickel or silver material identical to a material of the heating cable 14.

Therefore, the connecting cable 31 may be electrically connected to one end of the heating cable 14 disposed inside the flexible heater 10 to supply power to the heating cable 14.

The explosion-proofing 30 may include a first sleeve 32 installed on the outer surface of a connection part where the heating cable 14 and the connecting cable 31 are connected to each other.

The first sleeve 32 may be configured in a substantially cylindrical shape, and may be coupled to the connection part through a press-coupling method while being disposed outside the connection part.

The explosion-proofing device 30 may further include a first bobbin 33 having the first sleeve 32 installed therein, and a first shielding member 34 configured to shield the first bobbin 33 by surrounding an outer portion of the first bobbin 33.

The first bobbin 33 may be configured in a substantially cylindrical shape, and may function as an insulating barrel to insulate an end portion of the heating cable 14, an end portion of the connecting cable 31, and the entire first sleeve 32, which are disposed in the first bobbin 33.

The first shielding member 34 may be formed by heating magnesium oxide (MgO) powder at a preset temperature.

A first finishing part 35 may be provided at the front and rear end portions of the first bobbin 33 and the first shielding member 34 to maintain airtightness, respectively.

The first finishing part 35 may close the front and rear end portions of the first bobbin 33 and the first shielding member 34 by welding.

The explosion-proofing device 30 configured in this way may supply power to the heating cable 14 by connecting the connecting cable 31, which is prepared by using the non-resistance cable, to the heating cable 14, and may prevent explosion accidents caused by disconnection and short-circuit due to external shock and vibration by thermally and electrically explosion-proofing the connection part.

The insulating device 40 may include a second sleeve 42 in which the connection part between the lead wire 41 connected to the terminal unit 18 and the connecting cable 31 is installed, a second bobbin 43 formed therein with a space where the second sleeve 42 is installed, and a second shielding member 44 configured to shield the second bobbin 43 by surrounding the outside of the second bobbin 43.

The insulating device 40 may be disposed at a position where the flexible heater 10 and the terminal unit 18 are connected, that is, on the outer surface of the flexible heater 10.

The second sleeve 42 may be configured in a substantially cylindrical shape, and may be coupled to the connection part through a press-coupling method while being disposed outside the connection part.

The second bobbin 43 may be configured in a substantially cylindrical shape, and may function as an insulating barrel to insulate an end portion of the connecting cable 31, an end portion of the lead wire 41, and the entire second sleeve 32, which are disposed in the second bobbin 43.

The second shielding member 44 may be formed by heating magnesium oxide (MgO) powder at a preset temperature.

A second finishing part 45 and a third finishing part 46 may be provided at front and rear end portions of the second bobbin 43 and the second shielding member 44 to maintain airtightness, respectively.

The second finishing part 45 may close the front end portions of the second bobbin 43 and the second shielding member 44 by a welding method.

The third finishing part 46 may close the rear end portions of the second bobbin 43 and the second shielding member 44 by injecting a heat-resistant epoxy material.

The insulating device 40 configured in this way may connect the connecting cable 31 to the other end of the lead wire 41 having one end connected to the terminal unit 18 to supply power to the heating cable 14, and may thermally and electrically insulate the connection part to form a cooling section.

Therefore, the present invention may connect between the heating cable and the terminal unit by using the explosion-proofing device and the insulating device, and may thermally and electrically explosion-proof and insulate the heating cable and the terminal unit, thereby significantly reducing the length of the cooling section compared to the length of the cooling section applied to the conventional flexible heater.

According to the experimental results, when the explosion-proofing device 30 and the insulating device 40 are applied to the flexible heater 10 according to the present embodiment, sufficient explosion-proof and insulating effects were obtained even if the length of the entire cooling section is set to about 20 cm to 30 cm.

Next, the coupling relationship and operation method of the heating cable connecting device and the flexible heater employing the same according to a preferred embodiment of the present invention will be described.

First, the operator arranges the heating cable 14 by winding the heating cable 14 on the outer surface of the bellows pipe 11 constituting the flexible heater 10, and couples the internal interlock pipe 12 and the external interlock pipe 13 to an inside and an outside of the bellows pipe 11, respectively.

Then, the operator inserts one end of the heating cable 14 and one end of the connecting cable 31 prepared by using the non-resistance cable into the first sleeve 32, respectively, in the flexible heater 10. In a state in which the cables 14 and 31 are disposed to overlap each other, the first sleeve 32 is coupled in a press-coupling manner to firmly and fixedly connect the end portions of the two cables 14 and 31 to each other.

Next, the first bobbin 33 is coupled to the outside of the first sleeve 32, and magnesium oxide (MgO) powder is heated at a preset temperature to form the first shielding member 34 that surrounds the outside of the first bobbin 33.

The first finishing part 35 is formed at the front and rear end portions of the first bobbin 33 and the first shielding member 34 assembled through the above process by welding. Accordingly, the front ends and the rear ends of the first bobbin 33 and the first shielding member 34 may be kept airtight by the first finishing part 35, respectively.

The explosion-proofing device 30 configured in this way may connect the heating cable 14 and the connecting cable 31 in the inside of the flexible heater 10, and it is possible to prevent the disconnection caused by heat generated from the flexible heater 10 and explosion caused by the short-circuit.

Then, the operator inserts the other end of the connecting cable 31 and one end of the lead wire 41 into the second sleeve 42, and press-couples the second sleeves 42 in a state in which the cables 31 and 41 are arranged to overlap each other, so that the end portions of the two cables 31 and 41 can be firmly and fixedly connected to each other.

In addition, the second bobbin 43 is coupled to the outside of the second sleeve 42, and the second shielding member 44 is formed by heating magnesium oxide (MgO) powder at a preset temperature such that the outside of the second bobbin 43 can be surrounded by the second shielding member 44.

The front end portions of the second bobbin 43 and the second shielding member 44 assembled through the above process are closed by a welding method to form the second finishing part 45. Then, an epoxy material having heat resistance is injected into the rear end portions of the second bobbin 43 and the second shielding member 44 to form the third finishing part 46. Accordingly, the front and rear end portions of the second bobbin 43 and the second shielding member 44 are closed by the second and third finishing parts 45 and 46, respectively, to maintain airtightness.

The insulating device 40 configured in this way may be provided on the outer surface of the flexible heater 10 where the flexible heater 10 and the terminal unit are connected so that the connecting cable 31 may be connected to the lead wire 41, thereby insulating and cooling the power supply line, and preventing heat generated from the flexible heater 10 from being transferred to the terminal unit 18.

Finally, the other end of the lead wire 41 may be connected to the terminal unit 18, and the heating cable 14 may receive power supplied to the terminal unit 18 through the power supply line composed of the connecting cable 31 and the lead wire 41 so that it is possible to heat the inside of the flexible heater 10.

Accordingly, the flexible heater according to the present invention can effectively prevent the powder from precipitating in the flexible heater by heating the fluid flowing inside the flexible heater to a predetermined temperature or above.

Through the above processes, the present invention can connect between the heating cable and the terminal unit by applying the explosion-proofing device and the insulating device, and can thermally and electrically insulate and cool the heating cable and the terminal unit, so that the length of the cooling section can be reduced compared to the cooling section applied to the conventional flexible heater.

As described above, according to the present invention, the power supply line can be thermally and electrically insulated by providing the explosion-proofing device and the insulating device on the inner and outer surfaces of the flexible heater, respectively.

That is, the present invention can effectively prevent the power supply line from being subject to thermal breakage and damage by providing the explosion-proofing device inside the flexible heater and providing the insulating device between the flexible heater and the terminal unit.

Accordingly, the present invention can prevent the disconnection of the power supply line due to thermal damage occurring in the flexible heater, thereby preventing the driving of the heating cable from being stopped due to the cut-off of the power supplied to the heating cable.

In addition, the present invention can effectively insulate and cool the power supply line thermally and electrically, thereby reducing the length of the cooling section compared to the length of the cooling section applied to the conventional flexible heater.

As a result, the present invention can prevent the power supply line from being broken or damaged, thereby minimizing time, human, and economic costs for maintenance work such as replacing the power supply line.

Although the invention made by the present inventor has been described in detail according to the above embodiment, the present invention is not limited to the above embodiment, and can be changed in various ways without departing from the subject matter of the invention.

The present invention is applicable to a heating cable connecting device that thermally and electrically insulates a power supply line by providing an explosion-proofing device and an insulating device on inside and outside surfaces of the flexible heater, respectively, and a flexible heater technology employing the heating cable connecting device.

What is claimed is:

1. A heating cable connecting device that insulates a heating cable applied to a flexible heater to connect the heating cable to a terminal, the heating cable connecting device comprising:
   - an explosion-proofing device configured to be connected to one end of a connecting cable by explosion-proofing one end of the heating cable; and
   - an insulating device enclosing a connection between another end of the connecting cable and one end of a lead wire, the lead wire having another end connected to the terminal, thereby insulating and connecting the heating cable and the lead wire through the connecting cable;
   - wherein the explosion-proofing device includes a first sleeve, a first bobbin, and a first shield, the first sleeve including a first connection portion where the heating cable and the connecting cable are connected to each other, the first bobbin being disposed therein and spaced apart from the first sleeve, and the first shield surrounding an outer portion of the first bobbin,
   - wherein front ends and rear ends of each of the first bobbin and the first shield are closed by a first finishing part,
   - wherein the insulating device includes a second sleeve, a second bobbin, and a second shield, the second sleeve including a second connection portion where the connecting cable and the lead wire are connected to each other, the second bobbin being disposed therein and spaced apart from the second sleeve, and the second shield surrounding an outer portion of the second bobbin, and
   - wherein the insulating device is disposed at a position where the flexible heater and the terminal are connected.

2. The heating cable connecting device of claim 1, wherein the connecting cable is a non-resistance cable and electrically connected to the one end of the heating cable disposed on the flexible heater in order to supply power to the heating cable.

3. The heating cable connecting device of claim 1, wherein front ends of each of the second bobbin and the second shield are closed by a second finishing part to maintain airtightness, and rear ends of each of the second bobbin and the second shield are closed by a third finishing part.

4. A flexible heater comprising:
   - a heating cable; and the heating cable connecting device of claim 1, wherein the heating cable connecting device connects the heating cable to a power supply line and is configured to reduce a risk of explosion due to disconnection or short circuit.

* * * * *